US012406353B2

(12) United States Patent
DiJoseph et al.

(10) Patent No.: US 12,406,353 B2
(45) Date of Patent: Sep. 2, 2025

(54) SYSTEMS AND METHODS FOR DEFECT DETECTION ON DISPLAYS

(71) Applicant: Communications Test Design, Inc., West Chester, PA (US)

(72) Inventors: Stephen Tate DiJoseph, Downingtown, PA (US); Garret Yoder, Exton, PA (US)

(73) Assignee: Communications Test Design, Inc., West Chester, PA (US)

( * ) Notice: Subject to any disclaimer, the term of this patent is extended or adjusted under 35 U.S.C. 154(b) by 495 days.

(21) Appl. No.: 18/087,312

(22) Filed: Dec. 22, 2022

(65) Prior Publication Data

US 2024/0212127 A1 Jun. 27, 2024

(51) Int. Cl.
*G06T 7/00* (2017.01)
*G06T 11/20* (2006.01)
*G06V 10/56* (2022.01)
*G09G 3/00* (2006.01)
*G09G 5/02* (2006.01)

(52) U.S. Cl.
CPC .......... *G06T 7/0008* (2013.01); *G06T 11/203* (2013.01); *G06V 10/56* (2022.01); *G09G 3/006* (2013.01); *G09G 5/02* (2013.01)

(58) Field of Classification Search
CPC .......... G09G 3/006; G09G 5/02; G06V 10/56; G06T 11/203; G06T 7/0004; G06T 7/0008; G06T 7/90; G06T 2207/30108
See application file for complete search history.

(56) References Cited

U.S. PATENT DOCUMENTS

2013/0082843 A1 4/2013 Wurzel et al.
2015/0187064 A1 7/2015 Huang
(Continued)

OTHER PUBLICATIONS

Hocenski, Z., and Tomislav Keser. "Failure detection and isolation in ceramic tile edges based on contour descriptor analysis." 2007 Mediterranean Conference on Control & Automation. IEEE, 2007. (Year: 2007).*

(Continued)

*Primary Examiner* — Gregory A Morse
*Assistant Examiner* — Stefano Anthony Dardano
(74) *Attorney, Agent, or Firm* — Duane Morris LLP

(57) ABSTRACT

Systems and methods for defect detection on displays are disclosed according to various embodiments. In one example, a disclosed method for detecting defects on an electronic device display comprises connecting an electronic device to a server computer having a processor and a non-transitory computer readable storage medium storing test software for testing the electronic device display. The method further comprises displaying an outline on the electronic device display, where the outline traces a perimeter of the electronic device display, and where the outline comprises pixels of a first color. The first color differs from a color of a pixel that is not on the perimeter of the electronic device display. The method further comprises capturing a digital image of the electronic device while the electronic device is displaying the outline, transmitting the digital image to the server computer, and analyzing the digital image at the server computer.

42 Claims, 17 Drawing Sheets

(56) References Cited

U.S. PATENT DOCUMENTS

2017/0177968 A1 6/2017 Albertini
2021/0116392 A1* 4/2021 Fitzgerald ............ G06K 7/1417

OTHER PUBLICATIONS

Reddy, P. Rajashekar, V. Amarnadh, and Mekala Bhaskar. "Evaluation of stopping criterion in contour tracing algorithms." International Journal of Computer Science and Information Technologies 3.3 (2012): 3888-3894. (Year: 2012).*
International Search Report and Written Opinion for PCT/US2023/082842 issued Apr. 1, 2024, 8 pages.

* cited by examiner

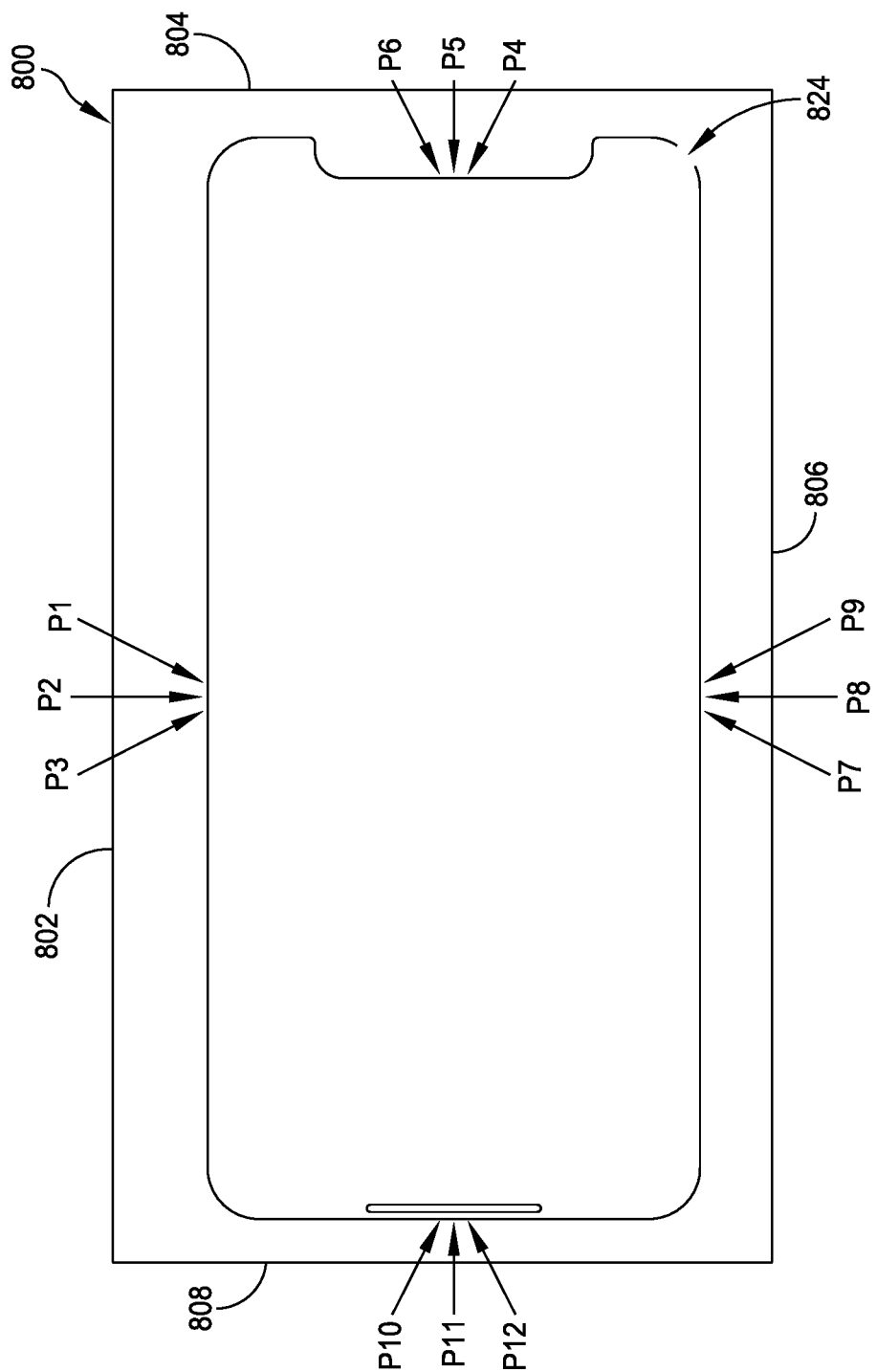

SYSTEMS AND METHODS FOR DEFECT DETECTION ON DISPLAYS

FIELD

The present disclosure generally relates to systems and methods for defect detection on displays, and more specifically, systems and methods for edge defect detection on electronic device displays.

BACKGROUND

Electronic devices such as tablets, smartphones, and smart watches include displays that may be damaged during manufacturing or during use of the device over time by a user. As a result, there is a need to test and detect defects in electronic device displays to determine their operability. Current image processing technology searches for straight edges on an electronic device display and will consider the new edge formed by a defect in an electronic device display to be an actual edge of the display, which results in those defects being ignored by image analysis during the testing process. This results in defective electronic devices being passed on to end customers.

SUMMARY

The present disclosure generally relates to systems and methods for defect detection on displays. More specifically, some embodiments of the present disclosure are directed to systems and methods for edge defect detection on electronic device displays.

The exemplary embodiments disclosed herein are directed to solving the issues relating to one or more of the problems presented in the prior art, as well as providing additional features that will become readily apparent by reference to the following detailed description when taken in conjunction with the accompanying drawings. In accordance with various embodiments, exemplary systems, methods, devices, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method is disclosed for detecting defects on an electronic device display. The method comprises: connecting an electronic device to a server computer having a processor and a non-transitory computer readable storage medium storing test software for testing the electronic device display; displaying an outline on the electronic device display, where the outline traces a perimeter of the electronic device display, and where the outline comprises pixels of a first color, the first color differing from a color of a pixel that is not on the perimeter of the electronic device display; capturing a digital image of the electronic device while the electronic device is displaying the outline; and transmitting the digital image to the server computer. The method further comprises analyzing the digital image at the server computer by performing the steps of: selecting a first edge pixel on a first edge of a perimeter of the digital image and iterating pixel by pixel towards an interior pixel of the digital image until a first pixel of the digital image comprising the first color ("P1") is found; selecting a second pixel of the digital image ("P2") where P2 is adjacent to P1 and P2 is of the first color; changing P2 to a second color different from the first color; selecting a third pixel of the digital image ("P3") where P3 is adjacent to P2, P3 is of the first color, and P3 is different than P1; iterating the digital image pixel by pixel from P1 to P3 along a path comprising only pixels of the first color; and determining that a defect exists on the electronic device display if no continuous path exists between P1 and P3 comprising only pixels of the first color.

In some embodiments, the step of iterating the digital image pixel by pixel from P1 to P3 comprises running an algorithm that searches for a continuous path of pixels of the first color between P1 and P3. In some embodiments, the algorithm is an A* search algorithm. In some embodiments, the method further comprises, for the condition where it is determined that no defect exists, outputting a passing test result. In some embodiments, for the condition where it is determined that a defect exists, outputting a failing test result. In some embodiments, the first color is green. In some embodiments, P1 and P3 each has a green RGB value of greater than 40. In some embodiments, the method further comprises sending the passing test result to a client computer or a database. In some embodiments, the method further comprises sending the failing test result to a client computer or a database. In some embodiments, the electronic device is one of: a tablet, a smartphone, a smart watch, a laptop, a computer monitor, and a television. In some embodiments, the digital image of the electronic device is captured by a camera on the electronic device. In some embodiments the method further comprises sending the failing test result to the electronic device, and displaying the failing test result on the electronic device.

In one embodiment, a method is disclosed for detecting defects on an electronic device display. The method comprises: connecting an electronic device to a server computer having a processor and a non-transitory computer readable storage medium storing test software for testing the electronic device display; displaying an outline on the electronic device display, where the outline traces a perimeter of the electronic device display, and where the outline comprises pixels of a first color, the first color differing from a color of a pixel that is not on the perimeter of the electronic device display; capturing a digital image of the electronic device while the electronic device is displaying the outline; and transmitting the digital image to the server computer. The method further comprises analyzing the digital image at the server computer by performing the steps of: selecting a first edge pixel on a first edge of a perimeter of the digital image and iterating pixel by pixel towards an interior pixel of the digital image until a first pixel of the digital image comprising the first color ("P1") is found; selecting a second pixel of the digital image ("P2") where P2 is adjacent to P1 and P2 is of the first color; changing P2 to a second color different from the first color; selecting a third pixel of the digital image ("P3") where P3 is adjacent to P2, P3 is of the first color, and P3 is different than P1; selecting a second edge pixel on a second edge of the perimeter of the digital image and iterating pixel by pixel towards an interior pixel of the digital image until a fourth pixel of the digital image comprising the first color ("P4") is found; selecting a fifth pixel of the digital image ("P5") where P5 is adjacent to P4 and P5 is of the first color; changing P5 to the second color; selecting a sixth pixel of the digital image ("P6") where P6 is adjacent to P5, P6 is of the first color, and P6 is different than P4; selecting a third edge pixel on a third edge of the perimeter of the digital image and iterating pixel by pixel towards an interior pixel of the digital image until a seventh pixel of the digital image comprising the first color ("P7") is found; selecting an eighth pixel of the digital image ("P8") where P8 is adjacent to P7 and P8 is of the first color; changing P8 to the second color; selecting a ninth pixel of the digital image ("P9") where P9 is adjacent to P8, P9 is of the first color, and P9 is different than P7; selecting a fourth edge pixel on a fourth edge of the perimeter of the digital image and iterating pixel by pixel towards an interior pixel of the digital image until a tenth pixel of the digital image comprising the first color ("P10") is found; selecting an eleventh pixel of the digital image ("P11") where P11 is adjacent to P10 and P11 is of the first color; changing P11 to the second color; selecting a twelfth pixel of the digital image ("P12") where P12 is adjacent to P11, P12 is of the first color, and P12 is different than P10; and running an algorithm that searches for a first continuous path comprising only pixels of the first color between P1 and P6, a second continuous path comprising only pixels of the first color between P4 and P9, a third continuous path comprising only pixels of the first color between P7 and P12, and a fourth continuous path comprising only pixels of the first color between P10 and P3.

In some embodiments, the method further comprises, for the condition where the algorithm finds the first continuous path, the second continuous path, the third continuous path, and the fourth continuous path, outputting a passing test result. In some embodiments, the method further comprises, for the condition where the algorithm does not find one or more of the first continuous path, the second continuous path, the third continuous path, and the fourth continuous path, outputting a failing test result. In some embodiments, the method further comprises, for the condition where the algorithm finds one or more discontinuities between P1 and P6, between P4 and P9, between P7 and P12, or between P10 and P3, indicating where the one or more discontinuities were found. In some embodiments, indicating where the one or more discontinuities were found comprises: drawing an ellipse between a gap start pixel and a gap end pixel, where the gap start pixel is a pixel on a first short continuous path from P1, P4, P7, or P10 that is closest to P6, P9, P12, or P3, respectively, and where the gap end pixel is a pixel on a second short continuous path from P6, P9, P12, or P3 that is closest to the respective gap start pixel. In some embodiments, the first color is green. In some embodiments, each pixel of the first color has a green RGB value of greater than 40. In some embodiments, the algorithm is an A* search algorithm. In some embodiments, the method further comprises sending the passing test result to a client computer or a database. In some embodiments, the method further comprises sending the failing test result to a client computer or a database. In some embodiments, the electronic device is one of: a tablet, a smartphone, a smart watch, a laptop, a computer monitor, and a television.

In one embodiment, a method is disclosed for detecting defects on an electronic device display. The method comprises connecting an electronic device to a server computer having a processor and a non-transitory computer readable storage medium storing test software for testing the electronic device display; displaying an outline on the electronic device display, where the outline traces a perimeter of the electronic device display, and where the outline comprises pixels of a first color, the first color differing from a color of a pixel that is not on the perimeter of the electronic device display; capturing a digital image of the electronic device while the electronic device is displaying the outline; and transmitting the digital image to the server computer. The method further comprises analyzing the digital image at the server computer by performing the steps of: selecting a first edge pixel on a first edge of a perimeter of the digital image and iterating pixel by pixel towards an interior pixel of the digital image until a first pixel of the digital image comprising the first color ("P1") is found; selecting a second pixel of the digital image ("P2") where P2 is adjacent to P1 and P2 is of the first color; iterating the digital image pixel by pixel from P1 to P2 along a path comprising only pixels of the first color; and determining that a defect exists in the electronic device display if no continuous path exists between P1 and P2 comprising only pixels of the first color.

In some embodiments, the step of iterating the digital image pixel by pixel from P1 to P2 comprises running an algorithm that searches for a continuous path of pixels of the first color between P1 and P2. In some embodiments, the method further comprises, for the condition where it is determined that no defect exists, outputting a passing test result. In some embodiments, the method further comprises, for the condition where it is determined that a defect exists, outputting a failing test result. In some embodiments, the first color is green. In some embodiments, P1 and P2 each has a green RGB value of greater than 40. In some embodiments, the method further comprises sending the passing test result to a client computer or a database. In some embodiments, the method further comprises sending the failing test result to a client computer or a database. In some embodiments, the electronic device is one of: a tablet, a smartphone, a smart watch, a laptop, a computer monitor, and a television.

In one embodiment, a system is disclosed for detecting defects on an electronic device display. The system comprises a test application on an electronic device configured to display an outline on the electronic device display. The outline traces a perimeter of the electronic device display, and the outline comprises pixels of a first color, the first color differing from a color of a pixel that is not on the perimeter of the electronic device display. The system further comprises a camera configured to capture digital images of the electronic device while the electronic device is displaying the outline. The system further comprises a server computer having a processor and a non-transitory computer readable storage medium storing test software for testing the electronic device. The server computer is configured to receive digital images of the electronic device and analyze each digital image by performing the steps of: selecting a first edge pixel on a first edge of a perimeter of the digital image and iterating pixel by pixel towards an interior pixel of the digital image until a first pixel of the digital image comprising the first color ("P1") is found; selecting a second pixel of the digital image ("P2") where P2 is adjacent to P1 and P2 is of the first color; changing P2 to a second color different from the first color; selecting a third pixel of the digital image ("P3") where P3 is adjacent to P2, P3 is of the first color, and P3 is different than P1; iterating the digital image pixel by pixel from P1 to P3 along a path comprising only pixels of the first color; and determining that a defect exists in the electronic device display if no continuous path exists between P1 and P3 comprising only pixels of the first color.

In some embodiments, the server computer is further configured to output one or more test results. In some embodiments, the system further comprises a database, where the server computer is further configured to send the one or more test results to the database. In some embodiments, the electronic device is one of: a tablet, a smartphone, a smart watch, a laptop, a computer monitor, and a television. In some embodiments, the first color is green. In some embodiments, P1 and P3 each has a green RGB value of greater than 40. In some embodiments, the system further comprises a client computer, where the server computer is further configured to send the one or more test results to the client computer. In some embodiments, the client computer comprises a graphical user interface (GUI). In some embodiments, the client computer is configured to send the one or more test results to a database.

In one embodiment, a method is disclosed for detecting defects on an electronic device display. The method comprises: displaying an outline on the electronic device display, where the outline traces a perimeter of the electronic device display, and where the outline comprises pixels of a first color, the first color differing from a color of a pixel that is not on the perimeter of the electronic device display; and capturing a digital image of the electronic device while the electronic device is displaying the outline. The method further comprises: analyzing the digital image at a test application on the electronic device by performing the steps of: selecting a first edge pixel on a first edge of a perimeter of the digital image and iterating pixel by pixel towards an interior pixel of the digital image until a first pixel of the digital image comprising the first color ("P1") is found; selecting a second pixel of the digital image ("P2") where P2 is adjacent to P1 and P2 is of the first color; changing P2 to a second color different from the first color; selecting a third pixel of the digital image ("P3") where P3 is adjacent to P2, P3 is of the first color, and P3 is different than P1; iterating the digital image pixel by pixel from P1 to P3 along a path comprising only pixels of the first color; and determining that a defect exists on the electronic device display if no continuous path exists between P1 and P3 comprising only pixels of the first color.

BRIEF DESCRIPTION OF THE DRAWINGS

Various exemplary embodiments of the present disclosure are described in detail below with reference to the following figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

FIG. 8A illustrates an exemplary digital image.

DETAILED DESCRIPTION

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

Figure 1:
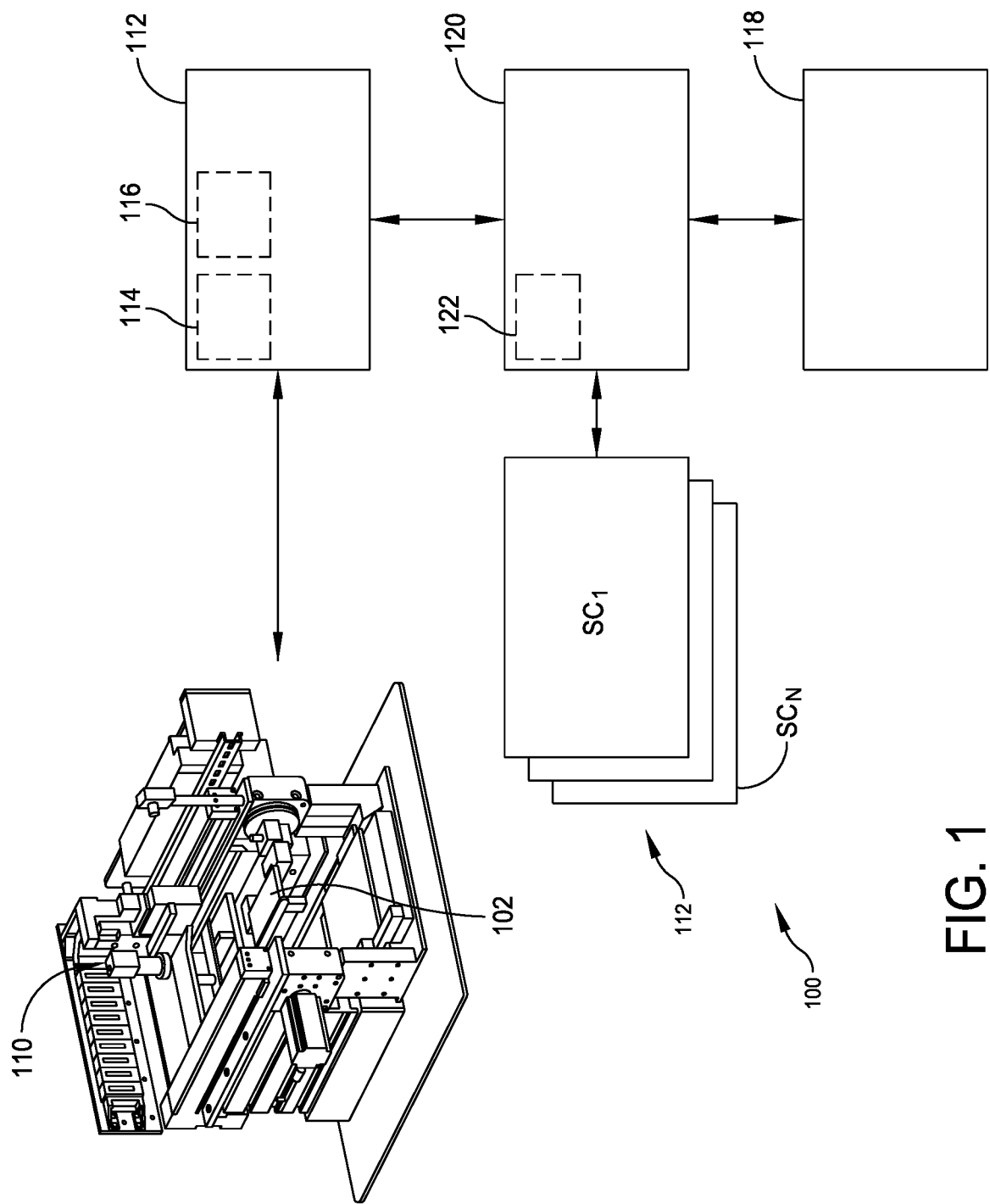
FIG. 1 illustrates a simplified block diagram showing an exemplary system for detecting defects on an electronic device display.
Figure 2:
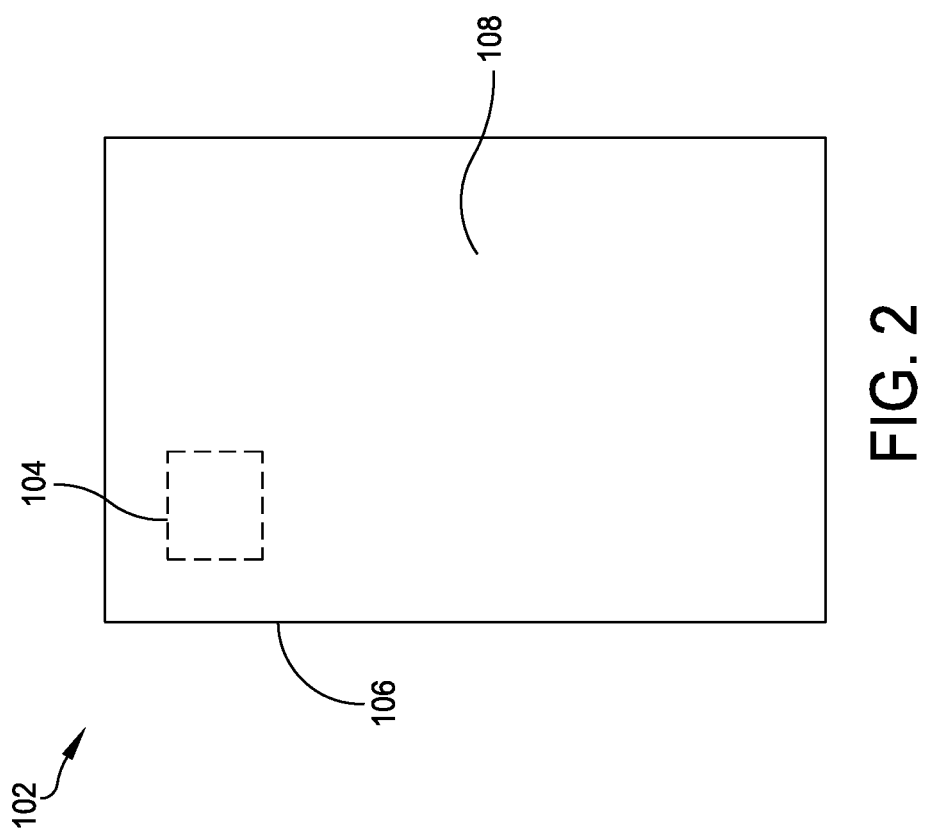
FIG. 2 illustrates a simplified block diagram showing an exemplary electronic device.

Various embodiments of the present disclosure provide methods and systems for detecting defects on an electronic device display. The present invention will detect any dark spots (i.e., defects) on the edge of an electronic device display (e.g., a smartphone display) and provides efficient methods for testing hundreds of electronic device displays each day. In some embodiments, the present invention may use an algorithm to analyze the edge of an electronic device display. FIG. 1 illustrates a simplified block diagram showing an exemplary system 100 for detecting defects on an electronic device display. FIG. 2 illustrates a simplified block diagram showing an exemplary electronic device 102 displaying an outline 106 on electronic device display 108. The electronic device 102 may include a test application 104 thereon.

The system 100 (shown in FIG. 1) comprises a test application 104 on an electronic device 102. The electronic device 102 is configured to display an outline 106 on the electronic device display 108, as shown in FIG. 2, and the test application 104 prompts the display of outline 106. In some embodiments, test software on server computer 112 may send a command to the test application 104 to trigger the display of outline 106. The outline 106 traces a perimeter of the electronic device display 108, and the outline 106 comprises pixels of a first color that differs from a color of a pixel that is not on the perimeter of the electronic device display 108. In some embodiments, the first color may be green.

Figure 3:
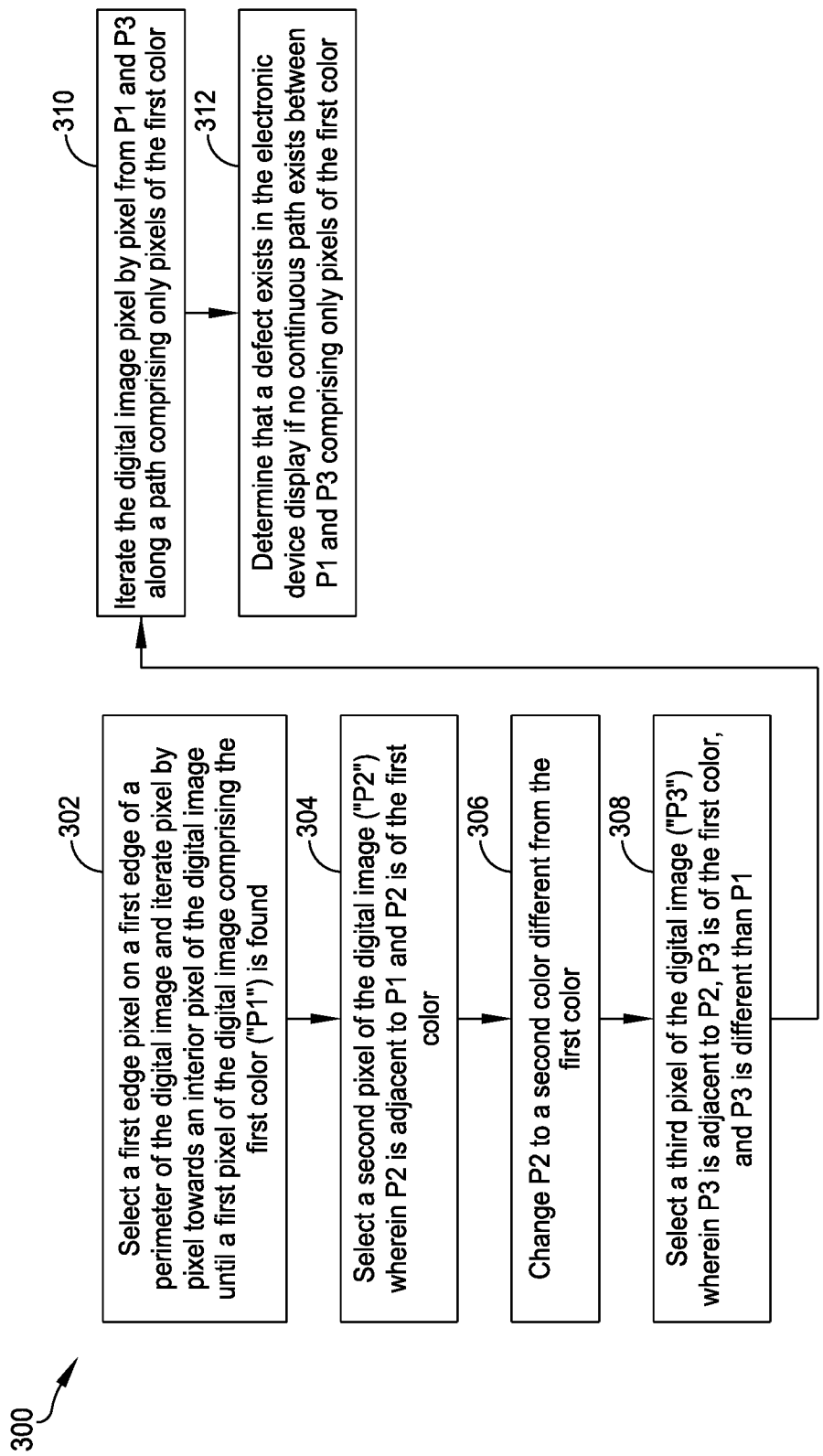
FIG. 3 is a flow chart showing an exemplary method for analyzing a digital image.

The system 100 further comprises a camera 110 configured to capture digital images of the electronic device 102 while the electronic device 102 is displaying the outline 106. In some embodiments, camera 110 may be a Basler® Ace® acA2500-14gc Color GigE Camera. In some embodiments, camera 110 is connected to server computer 112 via a Power over Ethernet (POE) adapter. This would allow the Ethernet connection to camera 110 to provide both data and power transfer simultaneously. In some embodiments, test software on the server computer 112 may send a command to camera 110 to prompt camera 110 to capture a digital image. The system 100 further comprises a server computer 112 that has a processor 114 and a memory 116. In one aspect, memory 116 is a non-transitory computer readable storage medium. Memory 116 stores test software for testing the electronic device 102. In some embodiments, the test software may be implemented in C#, C++, Java, or another programming language capable of image processing. In some embodiments, the server computer 112 may include or be coupled to a graphical user interface (GUI) (not shown) to allow a user to control the testing process. The server computer 112 is configured to receive digital images of the electronic device 102 (e.g., digital image 500, digital image 800, digital image 1100). In some embodiments, memory 116 is configured to store the received digital images. The server computer 112 is configured to analyze each digital image by performing the steps of method 300, as shown in FIG. 3. In one aspect, the processor 114 of the server computer 112 may be configured to perform the steps of method 300.

In some embodiments, system 100 further comprises a client computer 120. The client computer 120 may comprise a GUI 122 and may host a GUI application that a human operator may interact with to commence testing of an electronic device 102. The client computer 120 may enable testing of multiple electronic devices 102 (connected to multiple server computers 112, e.g., $SC_1$ to $SC_N$). In some embodiments, multiple electronic devices may be tested simultaneously. GUI 122 would enable a human operator to commence, control, and review the testing process for each of these electronic devices 102. As illustrated in FIG. 1, client computer 120 may be connected to multiple server computers 112 (e.g., $SC_1$ to $SC_N$), which enables testing of multiple electronic devices 102 simultaneously using one client computer 120. In some embodiments, a server computer 112 is configured to send test results to client computer 120. In some embodiments GUI 122 may display test results. A failing test result may be indicated by a red "X" on the GUI 122. In some embodiments, system 100 further comprises a database 118. In some embodiments, client computer 120 is configured to send test results to database 118. In some embodiments, database 118 is configured to print labels that are indicative of test results (e.g., pass or fail).

In some embodiments, camera 110 may be connected to server computer 112 via a wired (e.g., Ethernet) or wireless connection. In some embodiments, server computer 112 may be connected to client computer 120 via a wired (e.g., Ethernet) or wireless connection. In some embodiments, server computer 112 may be connected directly to database 118 via a wired (e.g., Ethernet) or wireless connection. In some embodiments, client computer 120 may be connected to database 118 via a wired (e.g., Ethernet) or wireless connection. In some embodiments electronic device 102 may be connected to server computer 112 via a wireless connection.

FIG. 1 is an exemplary depiction of system 100. In some embodiments, electronic device 102 may be positioned on an assembly line. In some embodiments, system 100 may comprise a plurality of cameras 110. In some embodiments, system 100 may comprise a plurality of server computers 112 connected to the client computer 120. In some embodiments, system 100 may comprise a plurality of testing applications 104 on a plurality of electronic devices 102.

In some embodiments, the system 100 may comprise a camera 110, a test application 104 on an electronic device 102, and a mirror (not shown). In this embodiment, the camera 110 may be a front-facing camera on the electronic device 102 being tested (i.e., a camera that is on the same side of the electronic device 102 as the display 108), and the mirror may be placed in front of the electronic device 102.

In this embodiment, electronic device display 108 may be configured to display an outline 106, and the front-facing camera (camera 110) on the electronic device 102 may be configured to capture a digital image of the electronic device displaying the outline 106 using the mirror. In some embodiments, the test application 104 may analyze the digital image at the electronic device 102 being tested (e.g., by performing steps 410-422, steps 712-744, or steps 1012-1018 (described in detail below) at the test application 104 instead of the server computer 112). In some embodiments, the test application 104 may output the test results on the electronic device 102 itself (e.g., by displaying the test results on electronic device display 108). In some embodiments, the test application 104 may send the test results to a server computer 112, a client computer 120, or a database 118. In some embodiments, the electronic device 102 may transmit the digital image to the server computer 112 for analysis.

Figure 5:
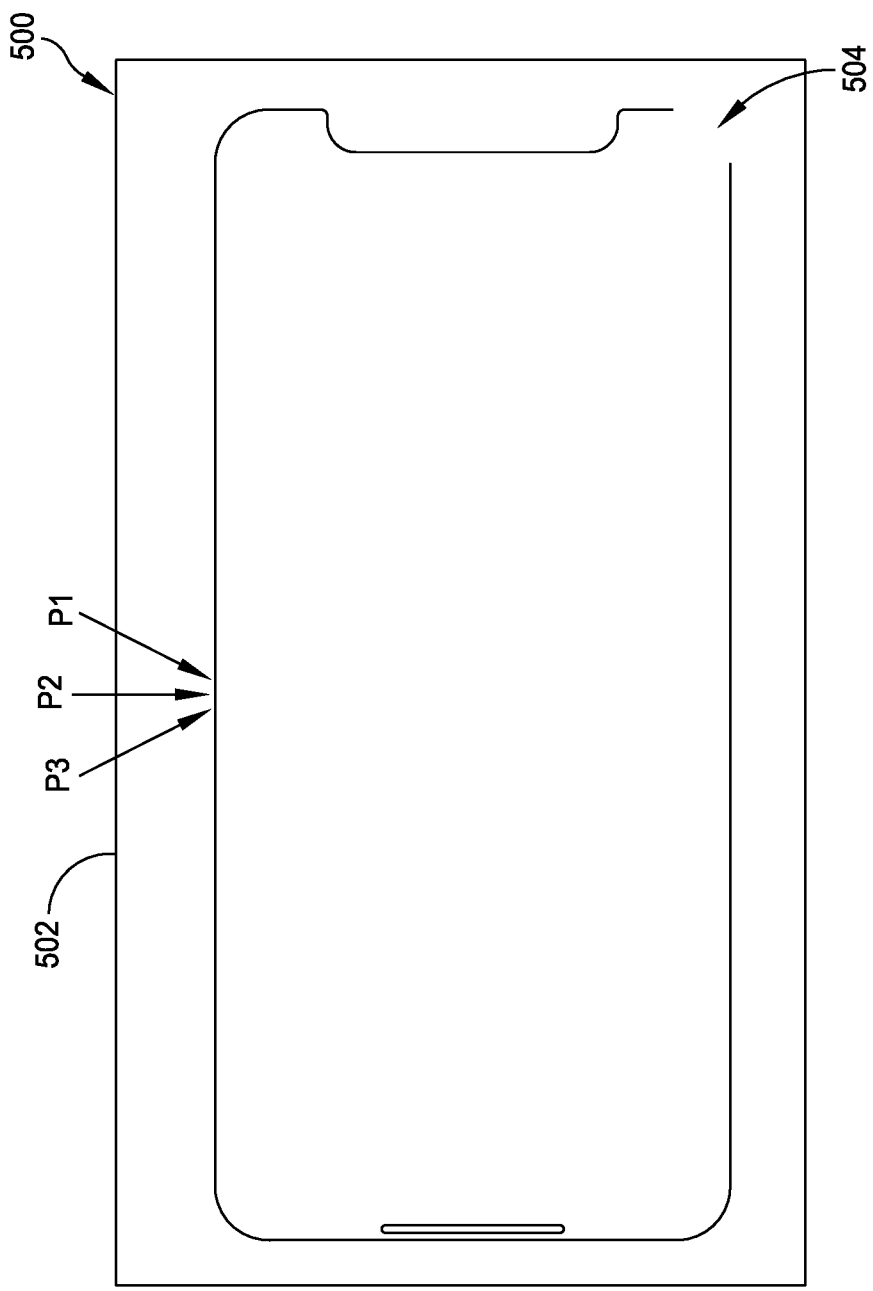
FIG. 5 illustrates an exemplary digital image.
Figure 6:
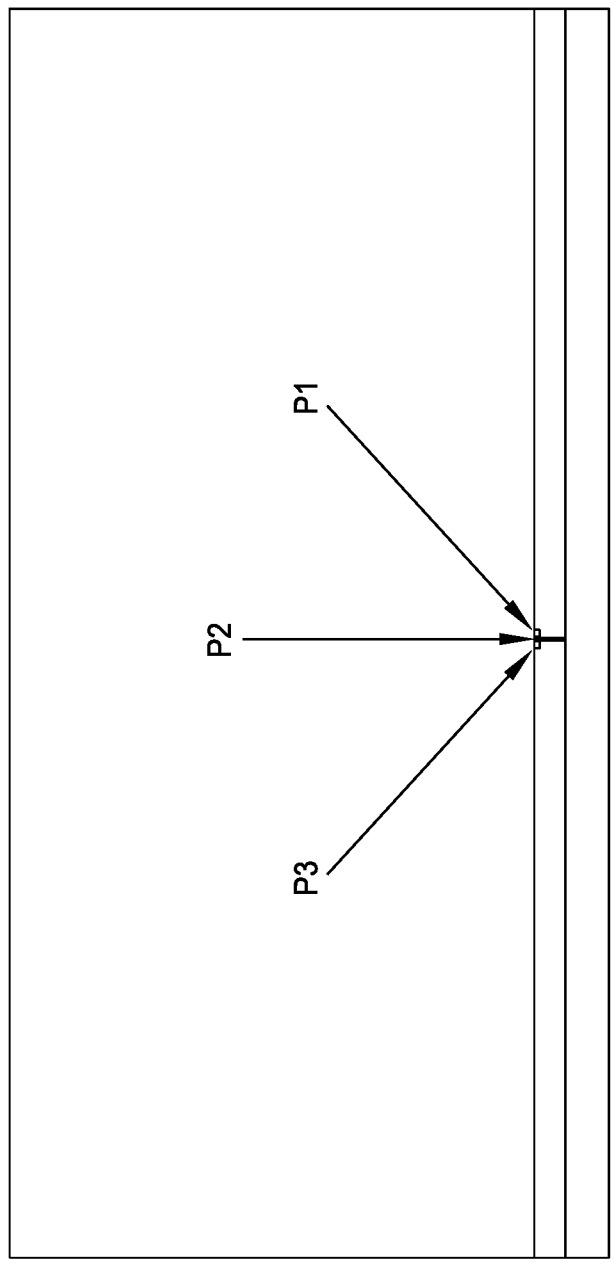
FIG. 6 illustrates an enlarged version of an exemplary pixel layout.

FIG. 3 is a flow chart showing an exemplary method 300 for analyzing a digital image, in accordance with some embodiments of the present disclosure. An exemplary digital image 500 is illustrated in FIG. 5. At step 302, the server computer 112 selects a first edge pixel on a first edge of a perimeter of the digital image (e.g., first edge 502) and iterates pixel by pixel towards an interior pixel of the digital image until a first pixel of the digital image comprising the first color ("P1") is found. In some embodiments, the first color is green. At step 304, the server computer 112 selects a second pixel of the digital image ("P2"). P2 is adjacent to P1, and P2 is of the first color (e.g., green). At step 306, the server computer 112 changes P2 to a second color different from the first color (e.g., black). At step 308, the server computer 112 selects a third pixel of the digital image ("P3"). P3 is adjacent to P2, P3 is of the first color (e.g., green), and P3 is different than P1. In some embodiments, P1 and P3 each has a green RGB value of greater than 40. In some embodiments, the threshold green RGB value may be dependent on the settings of camera 110. An exemplary layout of P1, P2, and P3 is shown on digital image 500 in FIG. 5. An enlarged version of an exemplary layout of P1, P2, and P3 is shown in FIG. 6. At step 310, the server computer 112 iterates the digital image (e.g., digital image 500) pixel by pixel from P1 to P3 along a path comprising only pixels of the first color. At step 312, the server computer 112 determines that a defect (e.g., defect 504) exists in the electronic device display if no continuous path exists between P1 and P3 comprising only pixels of the first color. FIG. 5 illustrates an exemplary defect 504. As shown in FIG. 5, there is no continuous path between P1 and P3 comprising only pixels of the first color because there are no pixels of the first color along the outline of the electronic display at defect 504, so the server computer 112 would correctly determine that a defect exists on the edge of the electronic display.

In some embodiments, the server computer 112 is further configured to output one or more test results. In some embodiments, the server computer 112 is further configured to send the one or more test results to client computer 120 or database 118. In some embodiments, the electronic device 102 is one of: a tablet, a smartphone, a smart watch, a laptop, a computer monitor, and a television. In some embodiments, the electronic device 102 is an electronic device that has a display capable of displaying at least two clearly different colors and that is configured to receive a command to show an outline of its display.

Figure 4:
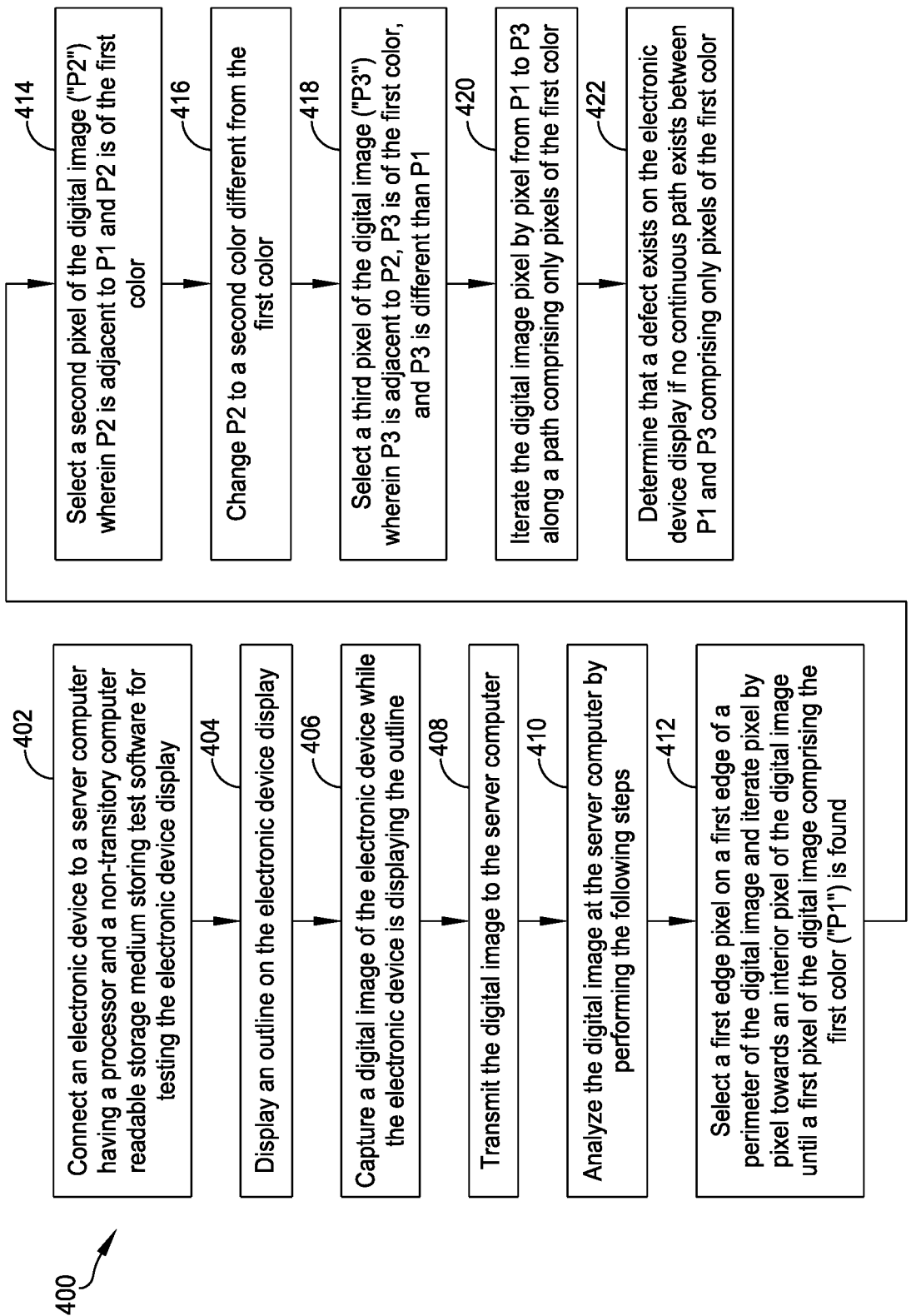
FIG. 4 is a flow chart showing an exemplary method for detecting defects on an electronic device display.

FIG. 4 is a flow chart showing an exemplary method 400 for detecting defects on an electronic device display (e.g., electronic device display 108), in accordance with some embodiments of the present disclosure. At step 402, an electronic device 102 is connected to a server computer 112, where the server computer 112 has a processor 114 and a non-transitory computer readable storage medium (e.g., memory 116) storing test software for testing the electronic device display 108. At step 404, an outline 106 is displayed on the electronic device display 108. The outline 106 traces a perimeter of the electronic device display 108, and the outline 106 comprises pixels of a first color. In some embodiments, the first color is green. The first color differs from a color of a pixel that is not on the perimeter of the electronic device display 108. At step 406, a digital image of the electronic device 102 (e.g., digital image 500) is captured while the electronic device 102 is displaying the outline 106. Camera 110 may perform step 406. At step 408, the digital image (e.g., digital image 500) is transmitted to the server computer 112.

At step 410, the digital image (e.g., digital image 500) is analyzed at the server computer 112 by performing steps 412-422. An exemplary digital image 500 is illustrated in FIG. 5. At step 412, the server computer 112 selects a first edge pixel on a first edge of a perimeter (e.g., first edge 502) of the digital image (e.g., digital image 500) and iterates pixel by pixel towards an interior pixel of the digital image until a first pixel of the digital image comprising the first color ("P1") is found. At step 414, the server computer 112 selects a second pixel of the digital image ("P2"). P2 is adjacent to P1, and P2 is of the first color. At step 416, the server computer 112 changes P2 to a second color different from the first color. At step 418, the server computer 112 selects a third pixel of the digital image ("P3"). P3 is adjacent to P2, P3 is of the first color, and P3 is different than P1. In some embodiments, P1 and P3 each has a green RGB value of greater than 40. At step 420, the server computer 112 iterates the digital image pixel by pixel from P1 to P3 along a path comprising only pixels of the first color. In some embodiments, step 420 comprises running an algorithm that searches for a continuous path of pixels of the first color between P1 and P3. In some embodiments, the algorithm is an A* search algorithm. In some embodiments, the algorithm is Dijkstra's algorithm. In some embodiments, other algorithms may be used. At step 422, the server computer 112 determines that a defect (e.g., defect 504) exists on the electronic device display if no continuous path exists between P1 and P3 comprising only pixels of the first color. In some embodiments, for the condition where it is determined that no defect exists, the server computer 112 may output a passing test result. In some embodiments, the server computer 112 may send the passing test result to a client computer (e.g., client computer 120) or a database (e.g., database 118). In some embodiments, for the condition where it is determined that a defect exists, the server computer 112 may output a failing test result. In some embodiments, the server computer 112 may send the failing test result to a client computer (e.g., client computer 120) or a database (e.g., database 118).

Figure 7A:
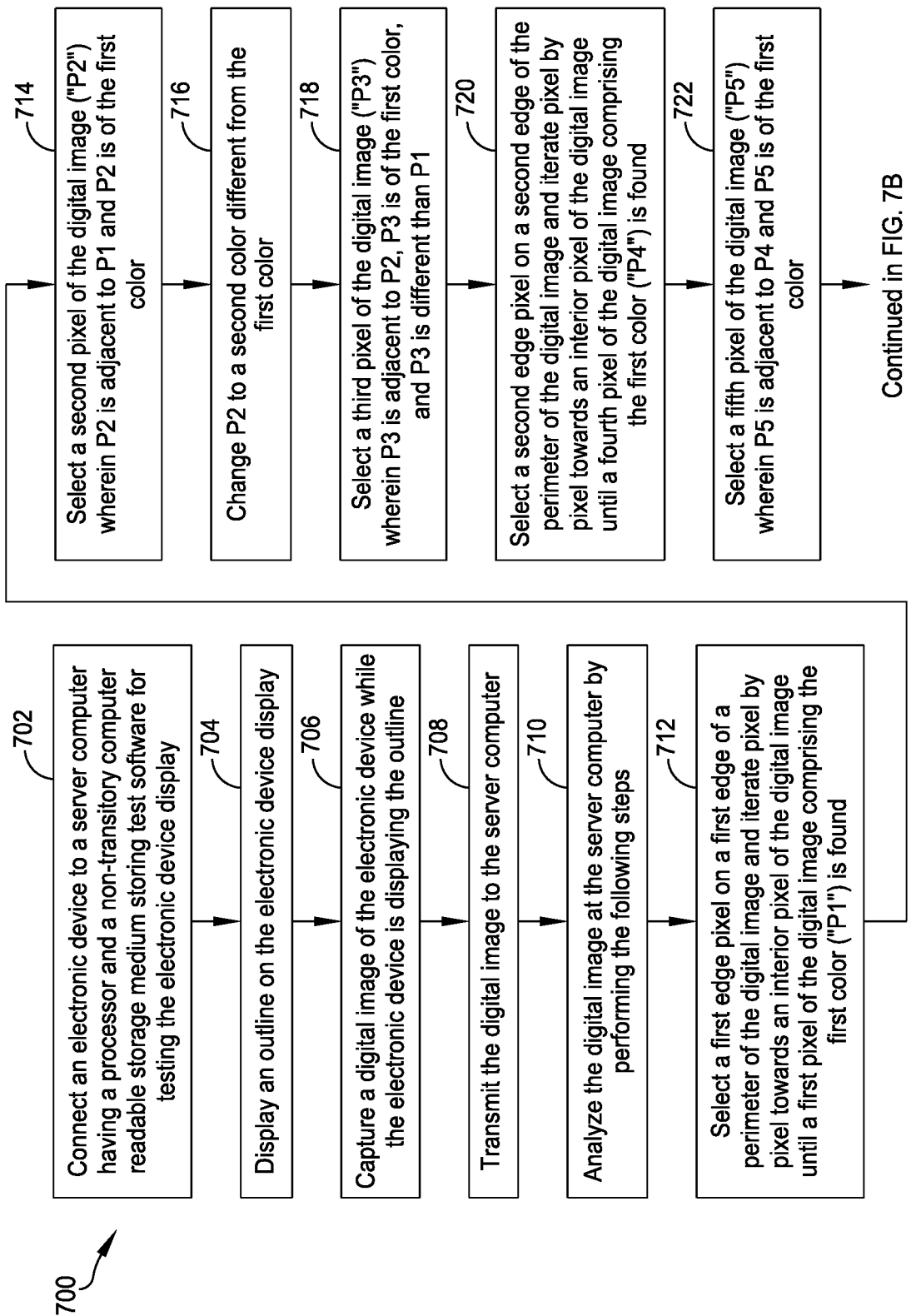
FIG. 7A and FIG. 7B are flow charts showing an exemplary method for detecting defects on an electronic device display.
Figure 7B:
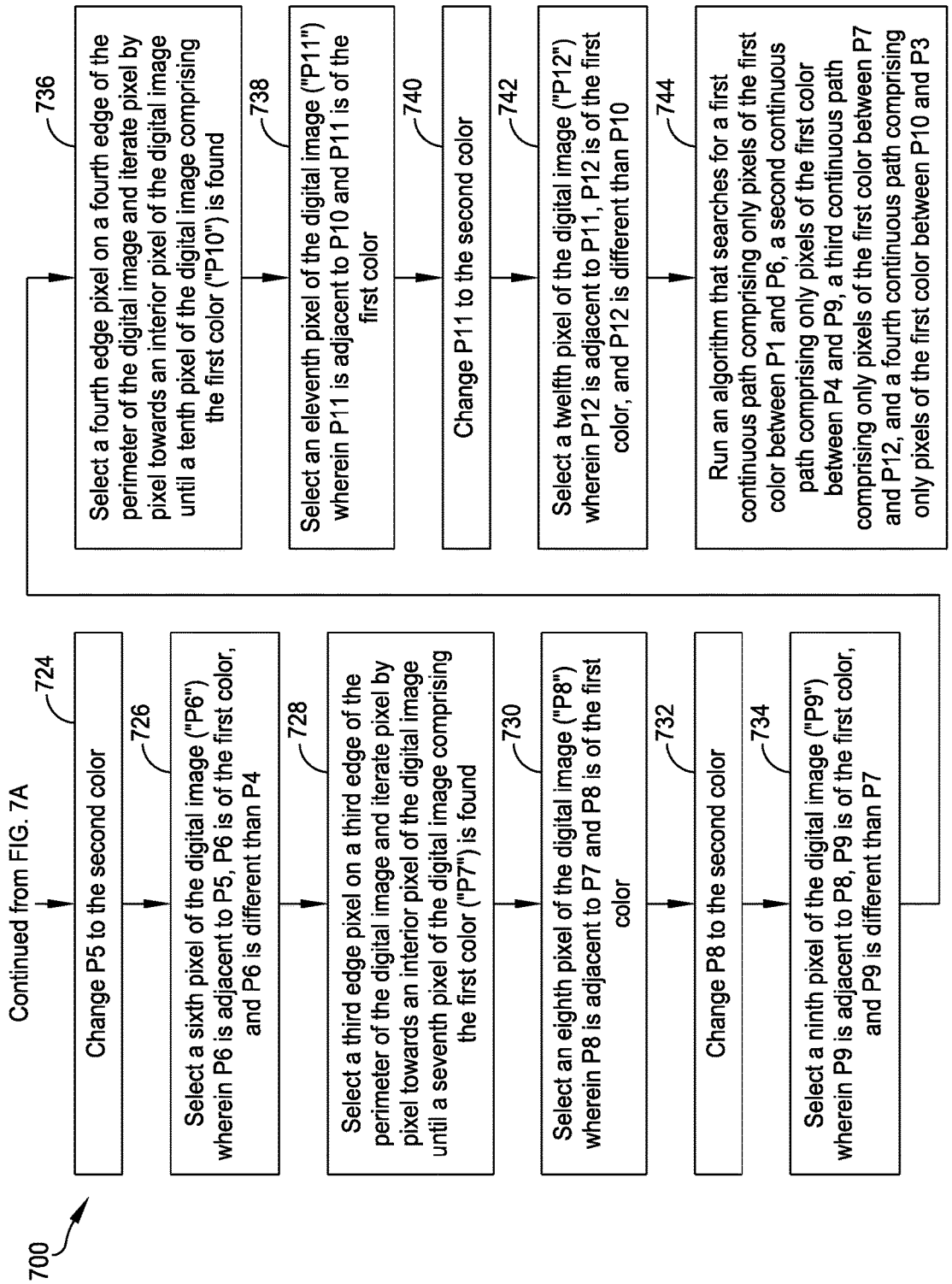

FIGS. 7A and 7B are flow charts showing an exemplary method 700 for detecting defects on an electronic device display (e.g., electronic device display 108), in accordance with some embodiments of the present disclosure. At step 702, an electronic device 102 is connected to a server computer 112, where the server computer 112 has a processor 114 and a non-transitory computer readable storage medium (e.g., memory 116) storing test software for testing the electronic device display 108. At step 704, an outline 106 is displayed on the electronic device display 108. The outline 106 traces a perimeter of the electronic device display 108, and the outline 106 comprises pixels of a first color. The first color differs from a color of a pixel that is not on the perimeter of the electronic device display 108. In some embodiments, the first color is green. In some embodiments, each pixel of the first color has a green RGB value of greater than 40. At step 706, a digital image of the electronic device 102 (e.g., digital image 800) is captured while the electronic device 102 is displaying the outline 106. Camera 110 may perform step 706. At step 708, the digital image (e.g., digital image 800) is transmitted to the server computer 112.

At step 710, the digital image (e.g., digital image 800) is analyzed at the server computer 112 by performing steps 712-744. An exemplary digital image 800 is illustrated in FIG. 8A. At step 712, the server computer 112 selects a first edge pixel on a first edge of a perimeter (e.g., first edge 802) of the digital image (e.g., digital image 800) and iterates pixel by pixel towards an interior pixel of the digital image until a first pixel of the digital image comprising the first color ("P1") is found. At step 714, the server computer 112 selects a second pixel of the digital image ("P2"). P2 is adjacent to P1 and P2 is of the first color. At step 716, the server computer 112 changes P2 to a second color different from the first color. At step 718, the server computer 112 selects a third pixel of the digital image ("P3"). P3 is adjacent to P2, P3 is of the first color, and P3 is different than P1. At step 720, the server computer 112 selects a second edge pixel on a second edge of the perimeter (e.g., second edge 804) of the digital image (e.g., digital image 800) and iterates pixel by pixel towards an interior pixel of the digital image until a fourth pixel of the digital image comprising the first color ("P4") is found. At step 722, the server computer 112 selects a fifth pixel of the digital image ("P5"). P5 is adjacent to P4 and P5 is of the first color. Method 700 continues in FIG. 7B.

At step 724, the server computer 112 changes P5 to the second color. At step 726, the server computer 112 selects a sixth pixel of the digital image ("P6"). P6 is adjacent to P5, P6 is of the first color, and P6 is different than P4. At step 728, the server computer 112 selects a third edge pixel on a third edge of the perimeter (e.g., third edge 806) of the digital image (e.g., digital image 800) and iterates pixel by pixel towards an interior pixel of the digital image until a seventh pixel of the digital image comprising the first color ("P7") is found. At step 730, the server computer 112 selects an eighth pixel of the digital image ("P8"). P8 is adjacent to P7 and P8 is of the first color. At step 732, the server computer 112 changes P8 to the second color. At step 734, the server computer 112 selecting a ninth pixel of the digital image ("P9"). P9 is adjacent to P8, P9 is of the first color, and P9 is different than P7. At step 736, the server computer 112 selects a fourth edge pixel on a fourth edge of the perimeter (e.g., fourth edge 808) of the digital image (e.g., digital image 800) and iterates pixel by pixel towards an interior pixel of the digital image until a tenth pixel of the digital image comprising the first color ("P10") is found. At step 738, the server computer 112 selects an eleventh pixel of the digital image ("P11"). P11 is adjacent to P10, and P11 is of the first color. At step 740, the server computer 112 changes P11 to the second color. At step 742, the server computer 112 selects a twelfth pixel of the digital image ("P12"). P12 is adjacent to P11, P12 is of the first color, and P12 is different than P10.

At step 744, the server computer 112, runs an algorithm that searches for a first continuous path comprising only pixels of the first color between P1 and P6, a second continuous path comprising only pixels of the first color between P4 and P9, a third continuous path comprising only pixels of the first color between P7 and P12, and a fourth continuous path comprising only pixels of the first color between P10 and P3. The first, second, third, and fourth continuous paths may go either clockwise or counterclockwise around the perimeter of the electronic device, and the paths do not need to go in the same direction (e.g., first and second continuous paths may go clockwise, and third and fourth continuous paths may go counterclockwise). In some embodiments, the algorithm is an A* search algorithm. In some embodiments, the algorithm is Dijkstra's algorithm. In some embodiments, other algorithms may be used. In some embodiments, for the condition where the algorithm finds the first continuous path, the second continuous path, the third continuous path, and the fourth continuous path, the server computer 112 outputs a passing test result. In some embodiments, the server computer sends the passing test result to a client computer (e.g., client computer 120) or a database (e.g., database 118). In some embodiments, for the condition where the algorithm does not find one or more of the first continuous path, the second continuous path, the third continuous path, and the fourth continuous path, the server computer 112 outputs a failing test result. In some embodiments, the server computer sends the failing test result to a client computer (e.g., client computer 120) or a database (e.g., database 118).

Figure 8B:
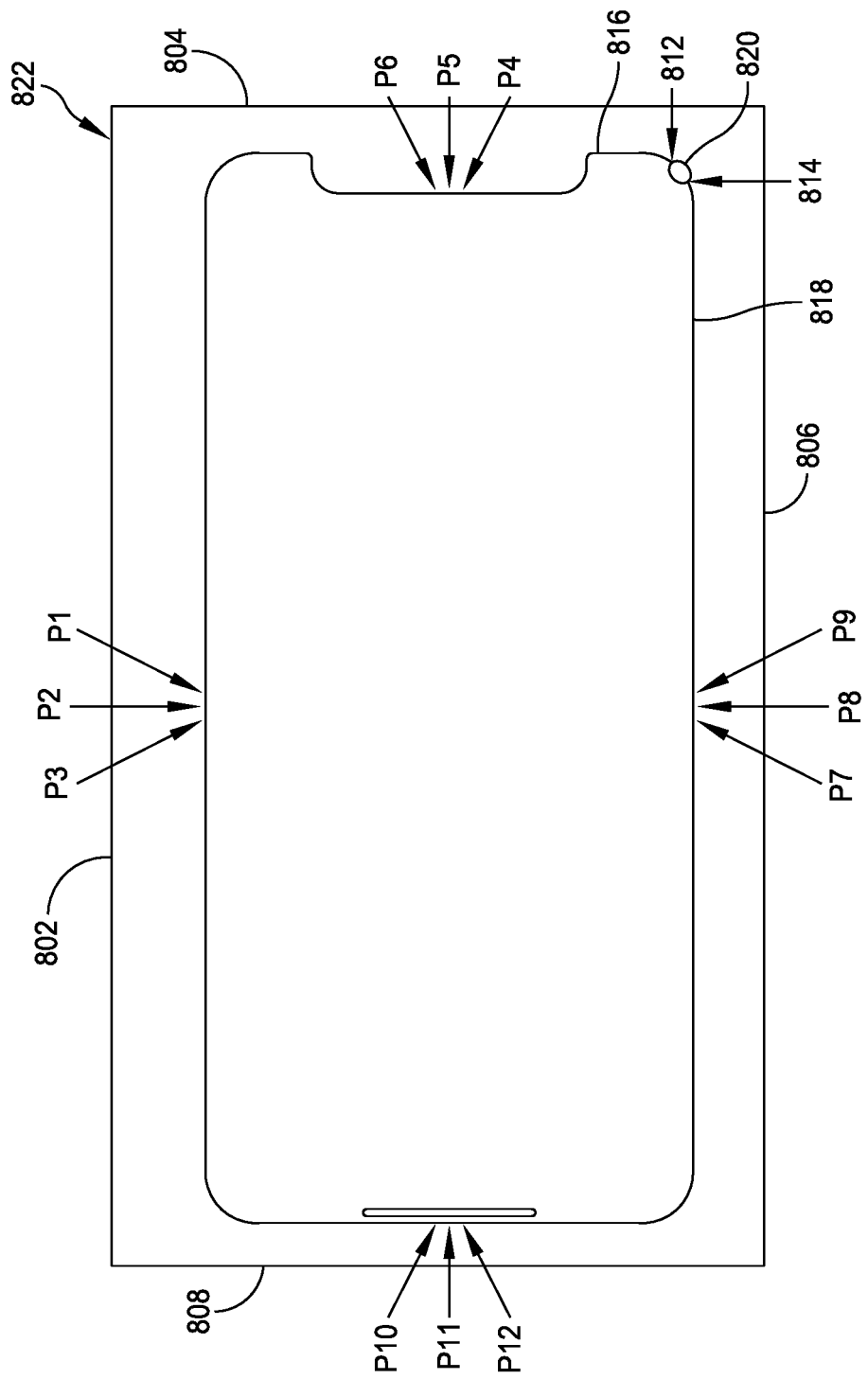
FIG. 8B illustrates an exemplary resulting digital image.
Figure 9A:
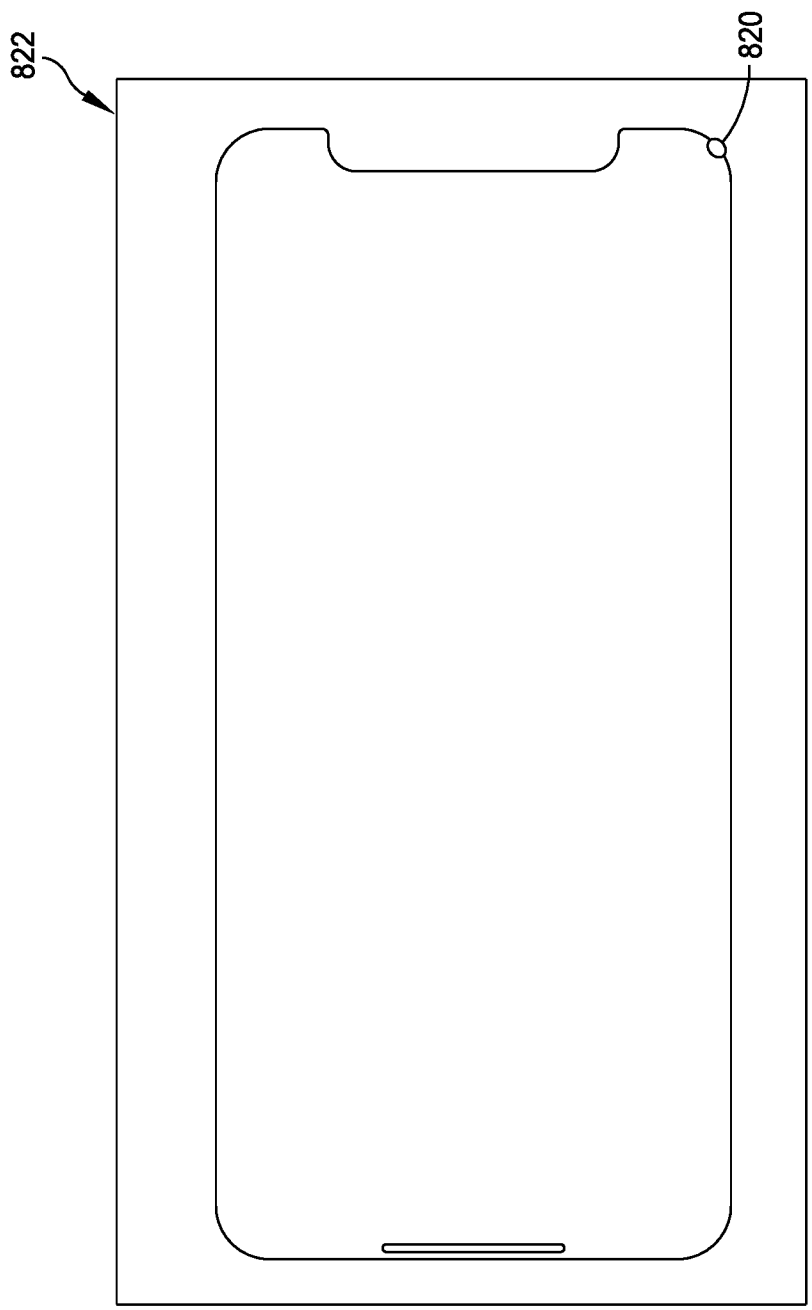
FIGS. 9A-9E illustrate exemplary resulting digital images.
Figure 9B:
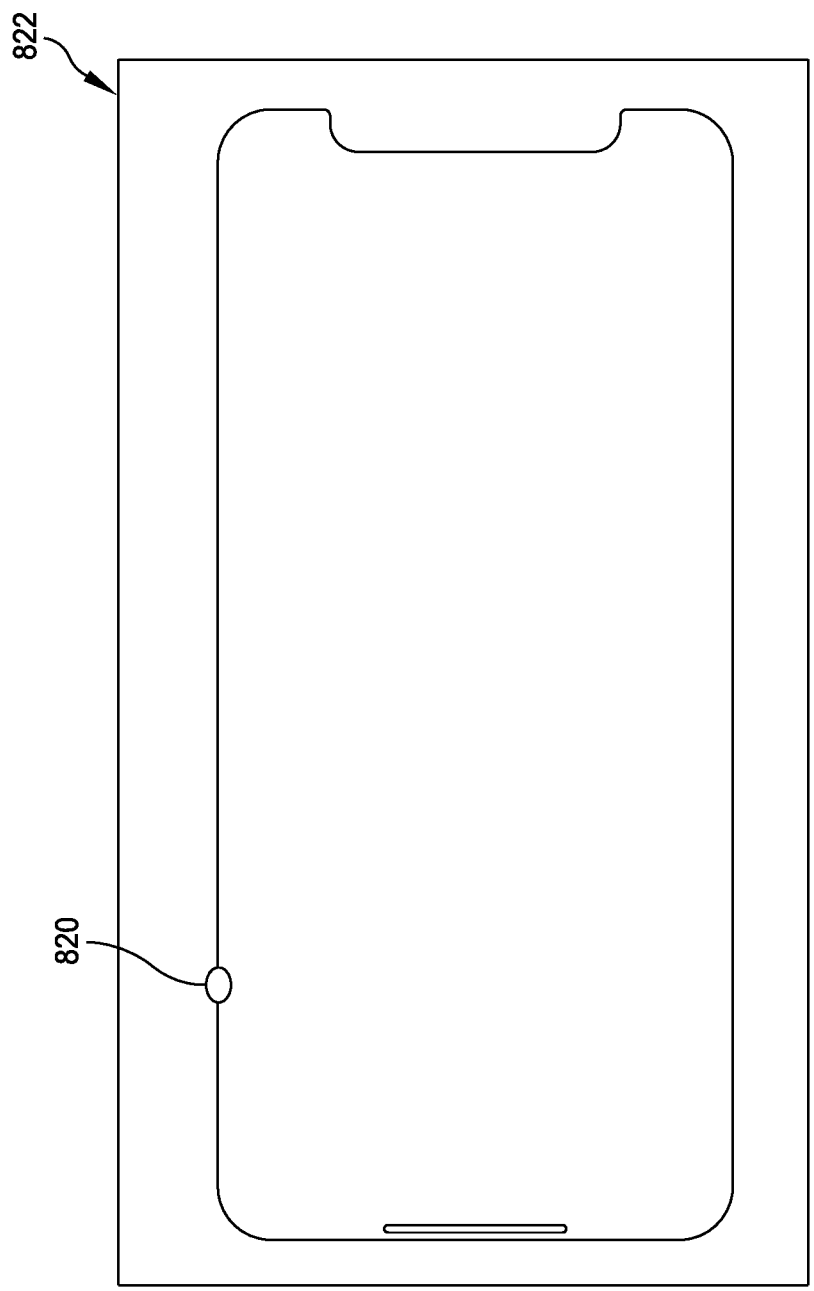
Figure 9C:
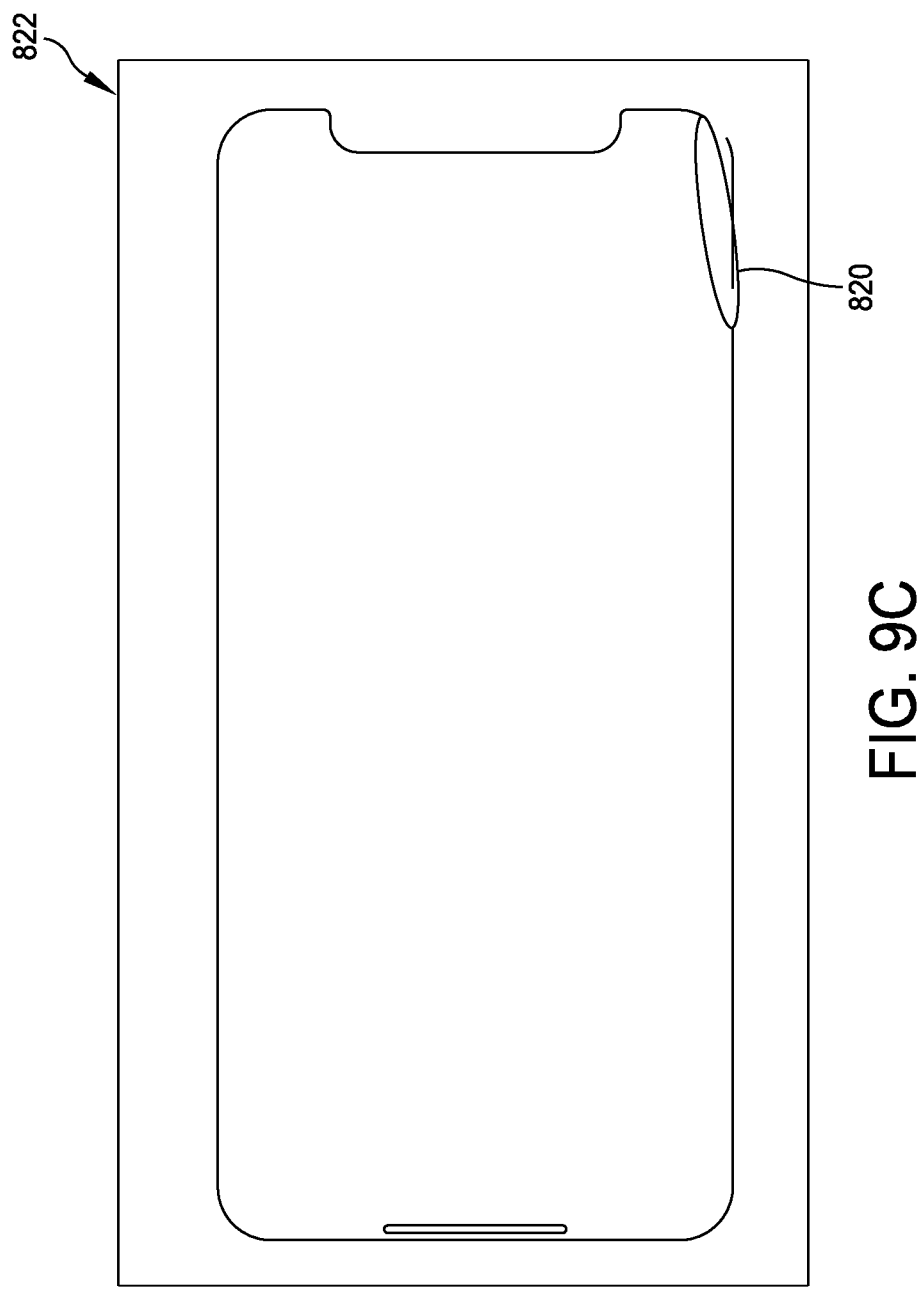
Figure 9D:
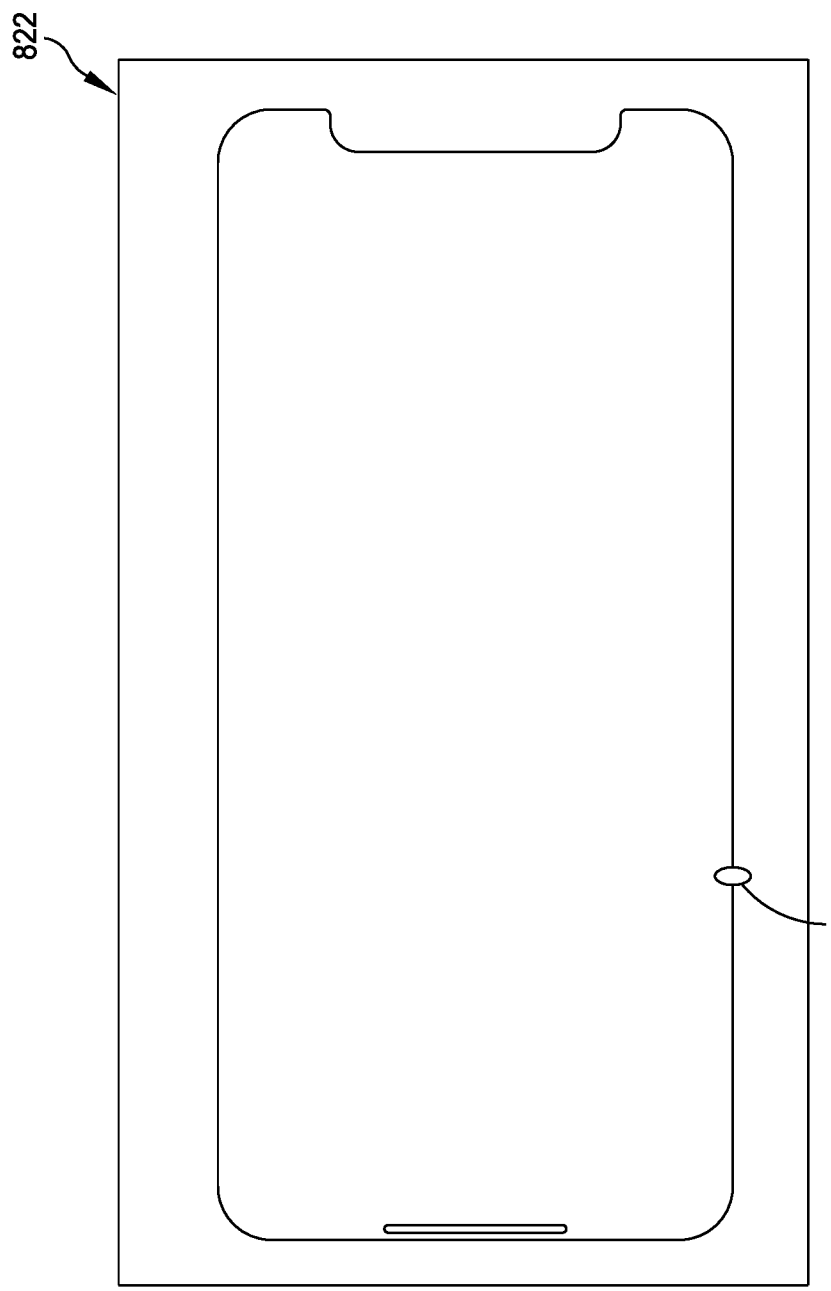
Figure 9E:
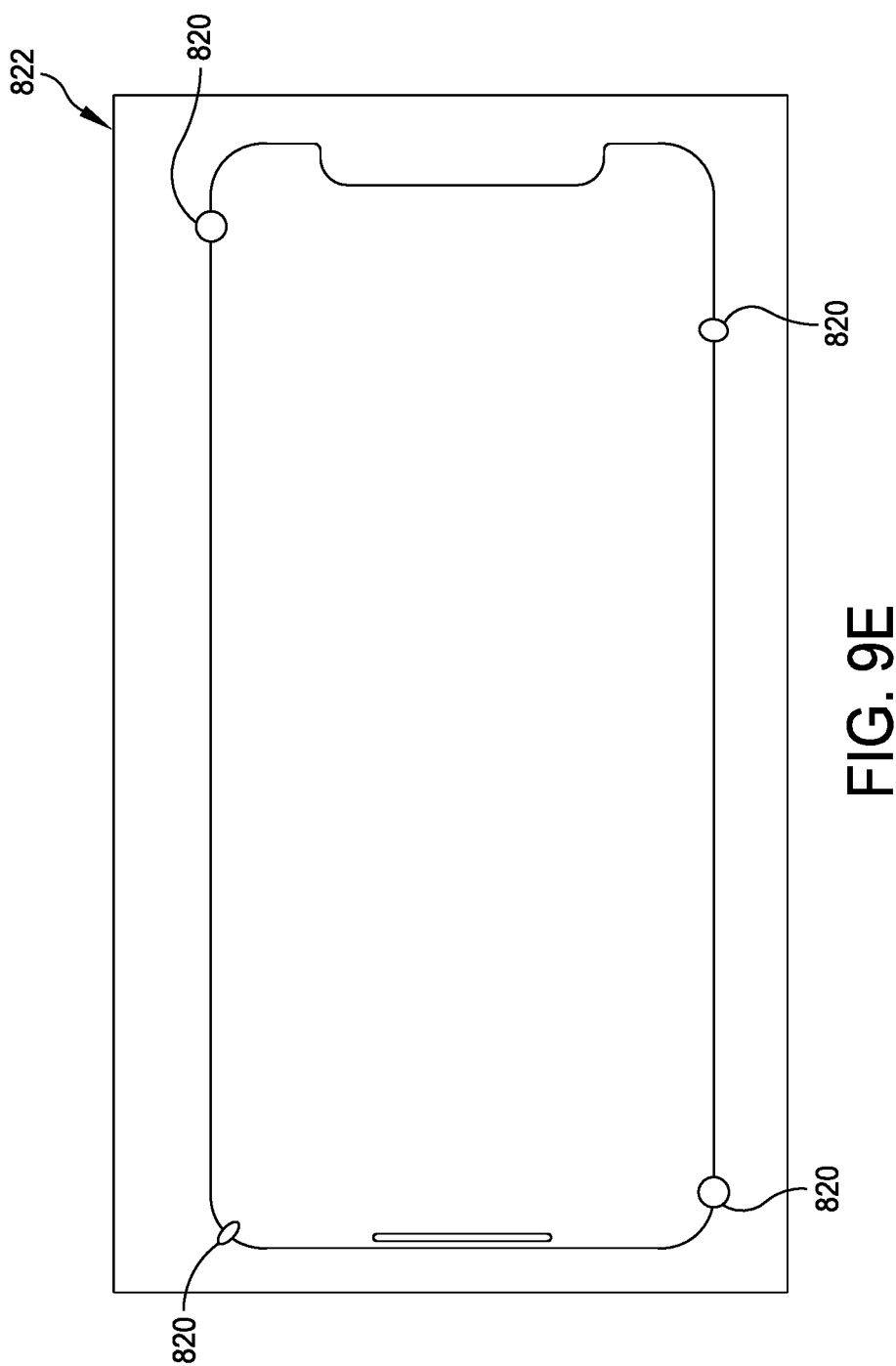

In some embodiments, for the condition where the algorithm finds one or more discontinuities (i.e., defects 824) between P1 and P6, between P4 and P9, between P7 and P12, or between P10 and P3, the server computer 112 indicates where the one or more discontinuities were found. In some embodiments, indicating where the one or more discontinuities were found comprises drawing an ellipse (e.g., ellipse 820) between a gap start pixel (e.g., gap start pixel 812) and a gap end pixel (e.g., gap end pixel 814) on a resulting digital image 822, as shown in FIG. 8B. The gap start pixel is a pixel on a first short continuous path from P1, P4, P7, or P10 that is closest to P6, P9, P12, or P3, respectively. The gap end pixel is a pixel on a second short continuous path from P6, P9, P12, or P3 that is closest to the respective gap start pixel. For example, as illustrated in FIG. 8B, gap start pixel 812 is a pixel on short continuous path 816 from P4 that is closest to P9, and gap end pixel 814 is a pixel on short continuous path 818 that is closest to gap start pixel 812. FIGS. 9A-9E illustrate exemplary resulting digital images 822 on which the server computer 112 has indicated where one or more discontinuities were found by drawing an ellipse 820 (or ellipses 820 in FIG. 9E) between a gap start pixel and a gap end pixel.

Figure 10:
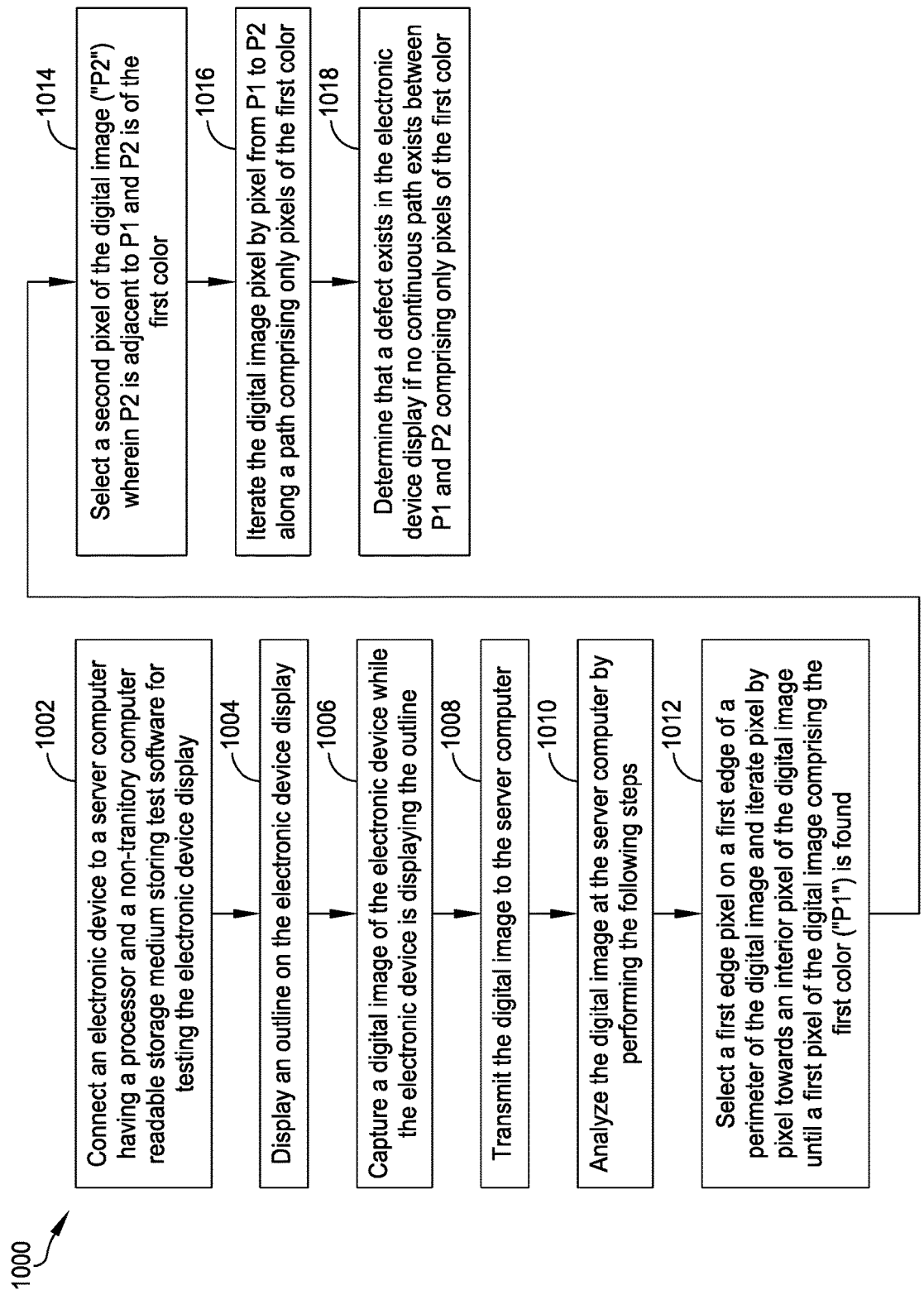
FIG. 10 is a flow chart showing an exemplary method for detecting defects on an electronic device display.

FIG. 10 is a flow chart showing an exemplary method 1000 for detecting defects on an electronic device display (e.g., electronic device display 108), in accordance with some embodiments of the present disclosure. At step 1002, an electronic device 102 is connected to a server computer 112, where the server computer 112 has a processor 114 and a non-transitory computer readable storage medium (e.g. memory 116) storing test software for testing the electronic device display 108. At step 1004, an outline 106 is displayed on the electronic device display 108. The outline 106 traces a perimeter of the electronic device display 108, and the outline 106 comprises pixels of a first color. The first color differs from a color of a pixel that is not on the perimeter of the electronic device display 108. In some embodiments, the first color is green. At step 1006, a digital image of the electronic device 102 (e.g., digital image 1100) is captured while the electronic device 102 is displaying the outline 106. Camera 110 may perform step 1006. At step 1008, the digital image (e.g., digital image 1100) is transmitted to the server computer 112.

Figure 11:
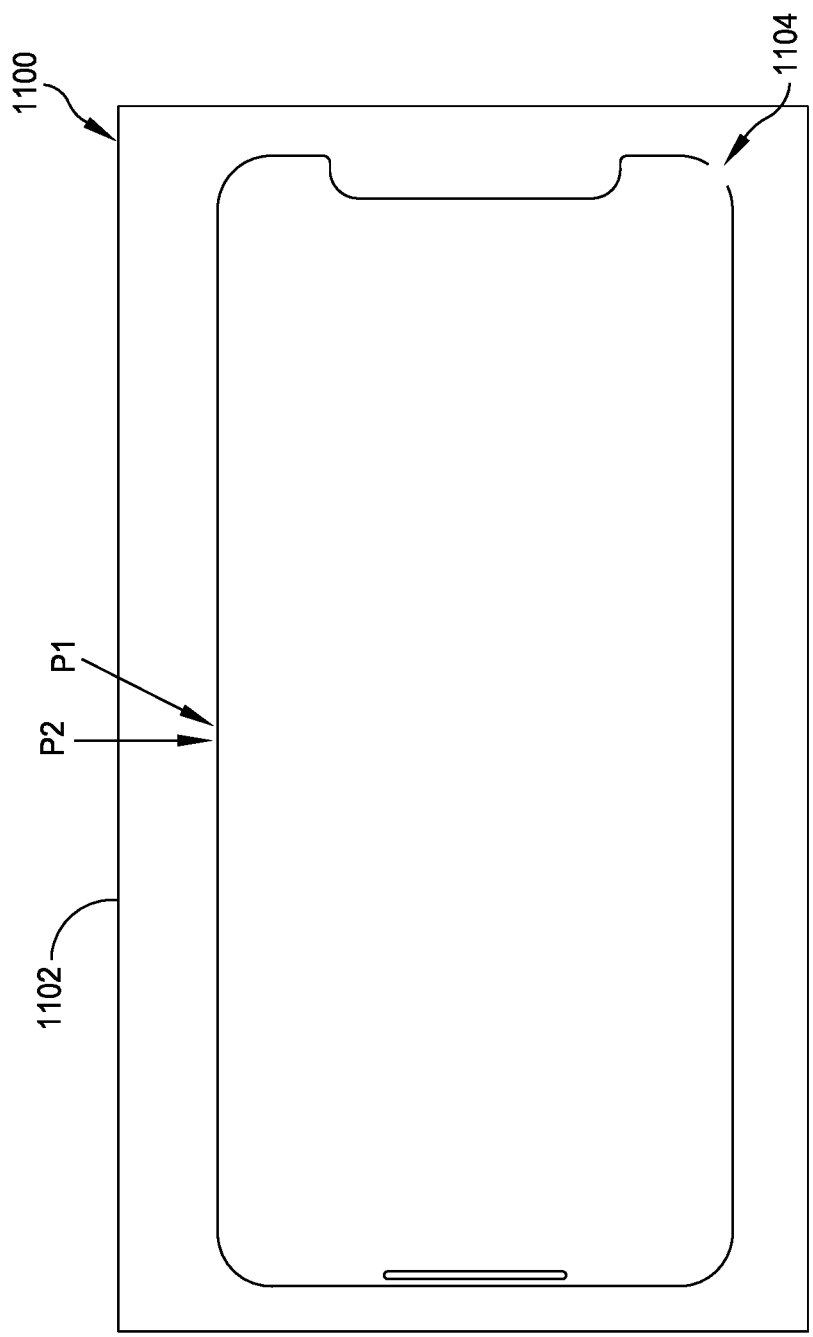
FIG. 11 illustrates an exemplary digital image.

At step 1010, the digital image (e.g., digital image 1100) is analyzed at the server computer 112 by performing steps 1012-1018. An exemplary digital image 1100 is illustrated in FIG. 11. At step 1012, the server computer 112 selects a first edge pixel on a first edge of a perimeter (e.g., first edge 1102) of the digital image (e.g., digital image 1100) and iterates pixel by pixel towards an interior pixel of the digital image until a first pixel of the digital image comprising the first color ("P1") is found. At step 1014, the server computer 112 selects a second pixel of the digital image ("P2"). P2 is adjacent to P1 and P2 is of the first color. In some embodiments, P1 and P2 each has a green RGB value of greater than 40. At step 1016, the server computer 112 iterates the digital image pixel by pixel from P1 to P2 along a path comprising only pixels of the first color. In some embodiments, iterating the digital image pixel by pixel from P1 to P2 comprises running an algorithm that searches for a continuous path of pixels of the first color between P1 and P2.

At step 1018, the server computer 112 determines that a defect (e.g., defect 1104) exists in the electronic device display if no continuous path exists between P1 and P2 comprising only pixels of the first color. In some embodiments, for the condition where it is determined that no defect exists, server computer 112 outputs a passing test result. In some embodiments, server computer 112 sends the passing test result to a client computer (e.g., client computer 120) or a database (e.g., database 118). In some embodiments, for the condition where it is determined that a defect exists, server computer 112 outputs a failing test result. In some embodiments, server computer 112 sends the failing test result to a client computer (e.g., client computer 120) or a database (e.g., database 118).

Although examples are illustrated and described herein, embodiments are nevertheless not limited to the details shown, since various modifications and structural changes may be made therein by those of ordinary skill within the scope and range of equivalents of the claims.

What is claimed is:

1. A method for detecting defects on an electronic device display comprising:
    connecting an electronic device to a server computer having a processor and a non-transitory computer readable storage medium storing test software for testing the electronic device display;
    displaying an outline on the electronic device display, wherein the outline traces a perimeter of the electronic device display, and wherein the outline comprises pixels of a first color, the first color differing from a color of a pixel that is not on the perimeter of the electronic device display;
    capturing a digital image of the electronic device while the electronic device is displaying the outline;
    transmitting the digital image to the server computer;
    analyzing the digital image at the server computer by performing the steps of:
        selecting a first edge pixel on a first edge of a perimeter of the digital image and iterating pixel by pixel towards an interior pixel of the digital image until a first pixel of the digital image comprising the first color ("P1") is found;
        selecting a second pixel of the digital image ("P2") wherein P2 is adjacent to P1 and P2 is of the first color;

changing P2 to a second color different from the first color;
selecting a third pixel of the digital image ("P3") wherein P3 is adjacent to P2, P3 is of the first color, and P3 is different than P1;
iterating the digital image pixel by pixel from P1 to P3 along a path comprising only pixels of the first color;
determining that a defect exists on the electronic device display if no continuous path exists between P1 and P3 comprising only pixels of the first color.

2. The method of claim 1 wherein the step of iterating the digital image pixel by pixel from P1 to P3 comprises running an algorithm that searches for a continuous path of pixels of the first color between P1 and P3.

3. The method of claim 2 wherein the algorithm is an A* search algorithm.

4. The method of claim 1 further comprising:
for the condition where it is determined that no defect exists, outputting a passing test result.

5. The method of claim 1 further comprising:
for the condition where it is determined that a defect exists, outputting a failing test result.

6. The method of claim 1 wherein the first color is green.

7. The method of claim 6 wherein P1 and P3 each has a green RGB value of greater than 40.

8. The method of claim 4 further comprising:
sending the passing test result to a client computer or a database.

9. The method of claim 5 further comprising:
sending the failing test result to a client computer or a database.

10. The method of claim 1 wherein the electronic device is one of: a tablet, a smartphone, a smart watch, a laptop, a computer monitor, and a television.

11. The method of claim 1 wherein the digital image of the electronic device is captured by a camera on the electronic device.

12. The method of claim 5 further comprising:
sending the failing test result to the electronic device; and
displaying the failing test result on the electronic device.

13. A method for detecting defects on an electronic device display comprising:
connecting an electronic device to a server computer having a processor and a non-transitory computer readable storage medium storing test software for testing the electronic device display;
displaying an outline on the electronic device display, wherein the outline traces a perimeter of the electronic device display, and wherein the outline comprises pixels of a first color, the first color differing from a color of a pixel that is not on the perimeter of the electronic device display;
capturing a digital image of the electronic device while the electronic device is displaying the outline;
transmitting the digital image to the server computer;
analyzing the digital image at the server computer by performing the steps of:
selecting a first edge pixel on a first edge of a perimeter of the digital image and iterating pixel by pixel towards an interior pixel of the digital image until a first pixel of the digital image comprising the first color ("P1") is found;
selecting a second pixel of the digital image ("P2") wherein P2 is adjacent to P1 and P2 is of the first color;
changing P2 to a second color different from the first color;
selecting a third pixel of the digital image ("P3") wherein P3 is adjacent to P2, P3 is of the first color, and P3 is different than P1;
selecting a second edge pixel on a second edge of the perimeter of the digital image and iterating pixel by pixel towards an interior pixel of the digital image until a fourth pixel of the digital image comprising the first color ("P4") is found;
selecting a fifth pixel of the digital image ("P5") wherein P5 is adjacent to P4 and P5 is of the first color;
changing P5 to the second color;
selecting a sixth pixel of the digital image ("P6") wherein P6 is adjacent to P5, P6 is of the first color, and P6 is different than P4;
selecting a third edge pixel on a third edge of the perimeter of the digital image and iterating pixel by pixel towards an interior pixel of the digital image until a seventh pixel of the digital image comprising the first color ("P7") is found;
selecting an eighth pixel of the digital image ("P8") wherein P8 is adjacent to P7 and P8 is of the first color;
changing P8 to the second color;
selecting a ninth pixel of the digital image ("P9") wherein P9 is adjacent to P8, P9 is of the first color, and P9 is different than P7;
selecting a fourth edge pixel on a fourth edge of the perimeter of the digital image and iterating pixel by pixel towards an interior pixel of the digital image until a tenth pixel of the digital image comprising the first color ("P10") is found;
selecting an eleventh pixel of the digital image ("P11") wherein P11 is adjacent to P10 and P11 is of the first color;
changing P11 to the second color;
selecting a twelfth pixel of the digital image ("P12") wherein P12 is adjacent to P11, P12 is of the first color, and P12 is different than P10;
running an algorithm that searches for a first continuous path comprising only pixels of the first color between P1 and P6, a second continuous path comprising only pixels of the first color between P4 and P9, a third continuous path comprising only pixels of the first color between P7 and P12, and a fourth continuous path comprising only pixels of the first color between P10 and P3.

14. The method of claim 13 further comprising:
for the condition where the algorithm finds the first continuous path, the second continuous path, the third continuous path, and the fourth continuous path, outputting a passing test result.

15. The method of claim 13 further comprising:
for the condition where the algorithm does not find one or more of the first continuous path, the second continuous path, the third continuous path, and the fourth continuous path, outputting a failing test result.

16. The method of claim 13 further comprising:
for the condition where the algorithm finds one or more discontinuities between P1 and P6, between P4 and P9, between P7 and P12, or between P10 and P3, indicating where the one or more discontinuities were found.

17. The method of claim 16 wherein indicating where the one or more discontinuities were found comprises:
drawing an ellipse between a gap start pixel and a gap end pixel, wherein the gap start pixel is a pixel on a first short continuous path from P1, P4, P7, or P10 that is closest to P6, P9, P12, or P3, respectively, and wherein the gap end pixel is a pixel on a second short continuous path from P6, P9, P12, or P3 that is closest to the respective gap start pixel.

18. The method of claim 13 wherein the first color is green.

19. The method of claim 18 wherein each pixel of the first color has a green RGB value of greater than 40.

20. The method of claim 13 wherein the algorithm is an A* search algorithm.

21. The method of claim 14 further comprising:
sending the passing test result to a client computer or a database.

22. The method of claim 15 further comprising:
sending the failing test result to a client computer or a database.

23. The method of claim 13 wherein the electronic device is one of: a tablet, a smartphone, a smart watch, a laptop, a computer monitor, and a television.

24. A method for detecting defects on an electronic device display comprising:
connecting an electronic device to a server computer having a processor and a non-transitory computer readable storage medium storing test software for testing the electronic device display;
displaying an outline on the electronic device display, wherein the outline traces a perimeter of the electronic device display, and wherein the outline comprises pixels of a first color, the first color differing from a color of a pixel that is not on the perimeter of the electronic device display;
capturing a digital image of the electronic device while the electronic device is displaying the outline;
transmitting the digital image to the server computer;
analyzing the digital image at the server computer by performing the steps of:
selecting a first edge pixel on a first edge of a perimeter of the digital image and iterating pixel by pixel towards an interior pixel of the digital image until a first pixel of the digital image comprising the first color ("P1") is found;
selecting a second pixel of the digital image ("P2") wherein P2 is adjacent to P1 and P2 is of the first color;
iterating the digital image pixel by pixel from P1 to P2 along a path comprising only pixels of the first color;
determining that a defect exists in the electronic device display if no continuous path exists between P1 and P2 comprising only pixels of the first color.

25. The method of claim 24 wherein the step of iterating the digital image pixel by pixel from P1 to P2 comprises running an algorithm that searches for a continuous path of pixels of the first color between P1 and P2.

26. The method of claim 24 further comprising:
for the condition where it is determined that no defect exists, outputting a passing test result.

27. The method of claim 24 further comprising:
for the condition where it is determined that a defect exists, outputting a failing test result.

28. The method of claim 24 wherein the first color is green.

29. The method of claim 28 wherein P1 and P2 each has a green RGB value of greater than 40.

30. The method of claim 26 further comprising:
sending the passing test result to a client computer or a database.

31. The method of claim 27 further comprising:
sending the failing test result to a client computer or a database.

32. The method of claim 24 wherein the electronic device is one of: a tablet, a smartphone, a smart watch, a laptop, a computer monitor, and a television.

33. A system for detecting defects on an electronic device display comprising:
a test application on an electronic device configured to display an outline on the electronic device display, wherein the outline traces a perimeter of the electronic device display, and wherein the outline comprises pixels of a first color, the first color differing from a color of a pixel that is not on the perimeter of the electronic device display;
a camera configured to capture digital images of the electronic device while the electronic device is displaying the outline; and
a server computer having a processor and a non-transitory computer readable storage medium storing test software for testing the electronic device, wherein the server computer is configured to receive digital images of the electronic device and analyze each digital image by performing the steps of:
selecting a first edge pixel on a first edge of a perimeter of the digital image and iterating pixel by pixel towards an interior pixel of the digital image until a first pixel of the digital image comprising the first color ("P1") is found;
selecting a second pixel of the digital image ("P2") wherein P2 is adjacent to P1 and P2 is of the first color;
changing P2 to a second color different from the first color;
selecting a third pixel of the digital image ("P3") wherein P3 is adjacent to P2, P3 is of the first color, and P3 is different than P1;
iterating the digital image pixel by pixel from P1 to P3 along a path comprising only pixels of the first color;
determining that a defect exists in the electronic device display if no continuous path exists between P1 and P3 comprising only pixels of the first color.

34. The system of claim 33 wherein the server computer is further configured to output one or more test results.

35. The system of claim 33 further comprising:
a database, wherein the server computer is further configured to send the one or more test results to the database.

36. The system of claim 33 wherein the electronic device is one of: a tablet, a smartphone, a smart watch, a laptop, a computer monitor, and a television.

37. The system of claim 33 wherein the first color is green.

38. The system of claim 37 wherein P1 and P3 each has a green RGB value of greater than 40.

39. The system of claim 33 further comprising:
a client computer, wherein the server computer is further configured to send the one or more test results to the client computer.

40. The system of claim 39, wherein the client computer comprises a graphical user interface (GUI).

41. The system of claim 39, wherein the client computer is configured to send the one or more test results to a database.

42. A method for detecting defects on an electronic device display comprising:
- displaying an outline on the electronic device display, wherein the outline traces a perimeter of the electronic device display, and wherein the outline comprises pixels of a first color, the first color differing from a color of a pixel that is not on the perimeter of the electronic device display;
- capturing a digital image of the electronic device while the electronic device is displaying the outline;
- analyzing the digital image at a test application on the electronic device by performing the steps of:
    - selecting a first edge pixel on a first edge of a perimeter of the digital image and iterating pixel by pixel towards an interior pixel of the digital image until a first pixel of the digital image comprising the first color ("P1") is found;
    - selecting a second pixel of the digital image ("P2") wherein P2 is adjacent to P1 and P2 is of the first color;
    - changing P2 to a second color different from the first color;
    - selecting a third pixel of the digital image ("P3") wherein P3 is adjacent to P2, P3 is of the first color, and P3 is different than P1;
    - iterating the digital image pixel by pixel from P1 to P3 along a path comprising only pixels of the first color;
    - determining that a defect exists on the electronic device display if no continuous path exists between P1 and P3 comprising only pixels of the first color.

* * * * *